United States Patent
Kamath et al.

(10) Patent No.: US 9,304,941 B2
(45) Date of Patent: Apr. 5, 2016

(54) SELF-ENCRYPTING FLASH DRIVE

(71) Applicant: Mangstor, Inc., Austin, TX (US)

(72) Inventors: Ashwin Kamath, Cedar Park, TX (US);
Paul E. Prince, Lago Vista, TX (US);
Trevor Smith, Austin, TX (US)

(73) Assignee: Mangstor, Inc., Austin, TX (US)

( * ) Notice: Subject to any disclaimer, the term of this patent is extended or adjusted under 35 U.S.C. 154(b) by 53 days.

(21) Appl. No.: 14/191,687

(22) Filed: Feb. 27, 2014

(65) Prior Publication Data

US 2015/0242332 A1    Aug. 27, 2015

(51) Int. Cl.
*G06F 12/14* (2006.01)
*H04L 9/06* (2006.01)
*H04L 9/08* (2006.01)
*H04L 9/32* (2006.01)

(52) U.S. Cl.
CPC .......... *G06F 12/1408* (2013.01); *H04L 9/0637* (2013.01); *H04L 9/0894* (2013.01); *H04L 9/3242* (2013.01); *G06F 2212/1052* (2013.01)

(58) Field of Classification Search
CPC ................ G06F 12/14; G06F 12/1408; G06F 2212/1052; G06F 2212/72; H04L 9/0637; H04L 9/0894; H04L 9/3242
See application file for complete search history.

(56) References Cited

U.S. PATENT DOCUMENTS

| | | | |
|---|---|---|---|
| 8,010,790 B2* | 8/2011 | Lee .......................... | G06F 21/10 380/201 |
| 2006/0282665 A1* | 12/2006 | Zhu et al. ...................... | 713/160 |
| 2007/0260891 A1* | 11/2007 | Starr et al. .................... | 713/193 |
| 2008/0082834 A1* | 4/2008 | Mattsson ....................... | 713/189 |
| 2008/0117679 A1* | 5/2008 | Srinivasan .............. | G06F 21/79 365/185.04 |
| 2010/0027783 A1* | 2/2010 | Yup ................................ | 380/44 |
| 2012/0278635 A1* | 11/2012 | Hars et al. .................... | 713/193 |
| 2013/0254459 A1* | 9/2013 | Laplace .................. | G06F 21/53 711/103 |

OTHER PUBLICATIONS

Butler et al., Disk-Enabled Authenticated Encryption, May 2010, 2010 IEEE 26th Symposium on Mass Storage Systems and Technologies, pp. 1-6.*
Cryptography Stack Exchange, Why should I use Authenticated Encryption instead of just encryption?, http://crypto.stackexchange.com/questions/12178/why-should-i-use-authenticated-encryption-instead-of-just-encryption, pp. 1-4 (Dec. 10, 2013).
Wikipedia, Authenticated Encryption, http://en.wikipedia.org/wiki/Authenticated_encryption, pp. 1-3 (Jan. 6, 2014).

* cited by examiner

*Primary Examiner* — Kenneth Chang
(74) *Attorney, Agent, or Firm* — Andrews Kurth LLP; Sean S. Wooden

(57) ABSTRACT

A method comprises receiving a plaintext message (m), encrypting the plaintext message and generating a cipher text (c) and authentication data (t), storing the cipher text in a user data portion of a data storage device, and storing the authentication data in a meta data portion of the data storage device.

18 Claims, 2 Drawing Sheets

SELF-ENCRYPTING FLASH DRIVE

FIELD

Secure hard drives are a class of disk drives that implement various security features to protect stored user data. Self-Encrypting Drives (SED) are a particular class of secure disk drives that automatically encrypt data as they are being written, and conditionally decrypt data as they are being read from the drive.

The contents of an SED is always encrypted and the encryption keys are themselves encrypted and protected in hardware. Because disk encryption is handled in the drive itself, the overall system performance is not affected or subject to attacks targeting other components of the system.

Due to heightened threat to data privacy and security, SEDs are viewed as an increasingly vital tool in combating data loss and theft. Designing SEDs poses technical challenges on how the encryption and decryption process can be performed.

SUMMARY

A method comprises receiving a plaintext message (m), encrypting the plaintext message and generating a cipher text (c) and authentication data (t), storing the cipher text in a user data portion of a data storage device, and storing the authentication data in a meta data portion of the data storage device.

A method comprises receiving an initialization vector (IV), receiving a key (k), reading cipher text (c) from a user data portion of a flash storage device, reading authentication data (t) from a meta data portion of the flash storage device, and decrypting the cipher text using the initialization vector, the key, and the authentication data, and generating plaintext (m).

A flash storage device comprises a memory space configured for storing user data, a memory space configured for storing meta data, an encryption module adapted to receive plaintext (m), a key (k), an authentication tag (t), and an initialization vector (IV) to encrypt the plaintext to generate a cipher text (c), and the flash memory device configured to store the cipher text in the user data portion of the flash storage device, and store the authentication tag in the meta data portion of the flash storage device.

DETAILED DESCRIPTION

There are a number of data encryption algorithms in use today, for instance AES (Advanced Encryption Standard), TLS (Transport Layer Security), and other algorithms such as authenticated encryption where an encryption algorithm is combined with a Message Authentication Code (MAC) to provide data confidentiality (privacy) as well as protection from message tampering to additionally provide data integrity (authenticity).

Flash storage devices have been recognized as an attractive data storage option for mobile computers and smartphone devices because of their small size, light-weight, shock resistance, fast access speed, and low power consumption. It is anticipated that with further advances in flash memory technology, its popularity may rival or even outpace hard disks. The flash memory device can be adapted to perform as a self-encrypting drive according to the present disclosure.

Figure 1:
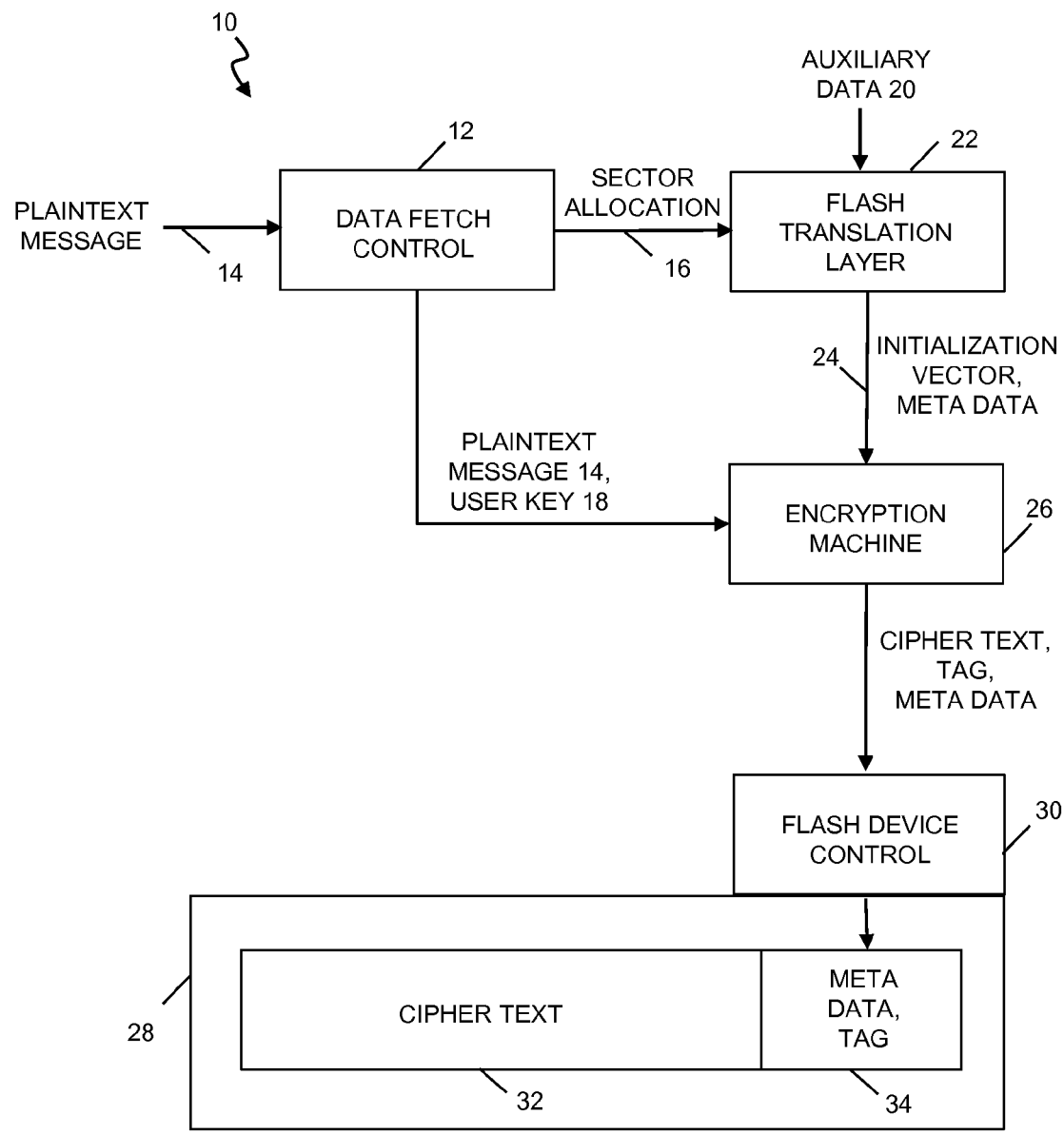
FIG. 1 is a simplified diagram illustrating a preferred embodiment of the encryption process according to the present disclosure.

FIG. 1 is a simplified diagram illustrating a preferred embodiment of the encryption process 10 for a flash storage device according to the present disclosure. A data fetch control block 12 receives the user's plaintext message (m) 14 to be stored in the flash storage device, and generates a sector allocation 16, and a user key (k) 18 along with the plaintext. The encryption key generally remains constant and it can be used to identify the user. The encryption key can be encrypted. Auxiliary data 20 such as the sector address combined with some function of an attribute of the flash block like its "age," for example, can be provided to a flash translation layer 22 to generate an initialization vector (IV). Other attributes such as utilization information and erase count may be used with or instead of age data. The primary function of the flash translation layer 22 is to perform a translation or mapping function in order to interface the linear flash memory with a file-based or sector-based system. The flash translation layer 22 is tasked with mapping between the logical block address (LBA) used by the host central processing unit (CPU) and the physical address locations in the flash storage device.

The following is a functional model of an authenticated encryption (AE) algorithm according to the present disclosure.

$$E(k, IV, m) \rightarrow (t, c)$$

Where E is the encrypting machine, k is a user key, IV is a unique (random or pseudorandom) initial value (Initialization Vector) per message, m is the plaintext message to be encrypted, t is an authentication tag, and c is the resultant cipher text.

As shown in FIG. 1, the flash translation layer 22 is adapted to further generate an initialization vector (IV). The initialization vector is variable and dependent on the auxiliary data 20 so that the encryption is secure. Therefore, the auxiliary data is used to generate a unique initialization vector each time a sector is written. The flash translation layer 22 also generates meta data, which are stored in separate portions of the flash storage device. The meta data is used for flash maintenance functions per sector. The user plaintext 14, user key 18, initialization vector and meta data 24 are provided to an encryption machine 26. The encryption machine 26 is adapted to encrypt the user plaintext 14 using the user key 18, and initialization vector, to generate an output consisting of the cipher text 32, an authentication tag, t, and the meta data (unchanged) 34. The output from the encryption machine 26 is stored in the user data portion of the flash device 28 via a NAND flash device controller 30.

In flash storage device there is some amount of meta data that is available for flash maintenance functions per sector. A portion of the area used to store meta data can be set aside to store the authentication data or "tag" that is output from the encryption process. This authentication tag is used during decryption to detect and protect from third party tampering of user data.

Additionally, the meta data passes through the same encryption machine and is optionally not encrypted, and it may still be accounted for in the authentication tag. Thus, the meta data, whether encrypted or not, may be protected from tampering because any tampering will be detected by the decryption engine due to a mismatched authentication tag. A different embodiment may have the meta data hashed and optionally encrypted using a completely different key (k) and initialization vector, giving it a mutually exclusive level of confidentiality and integrity with respect to the user data.

The decryption machine inverts this process as follows:

$$D(k, IV, c, t) \rightarrow m \text{ OR NULL}$$

Where D is the decrypting machine, IV is the same unique number used during encryption, c is the cipher text, t is the authentication tag, and m is the plaintext message. If the cipher text has been tampered with the decryption will output a "bottom" or "NULL" which implies that the decryption was not successful.

Figure 2:
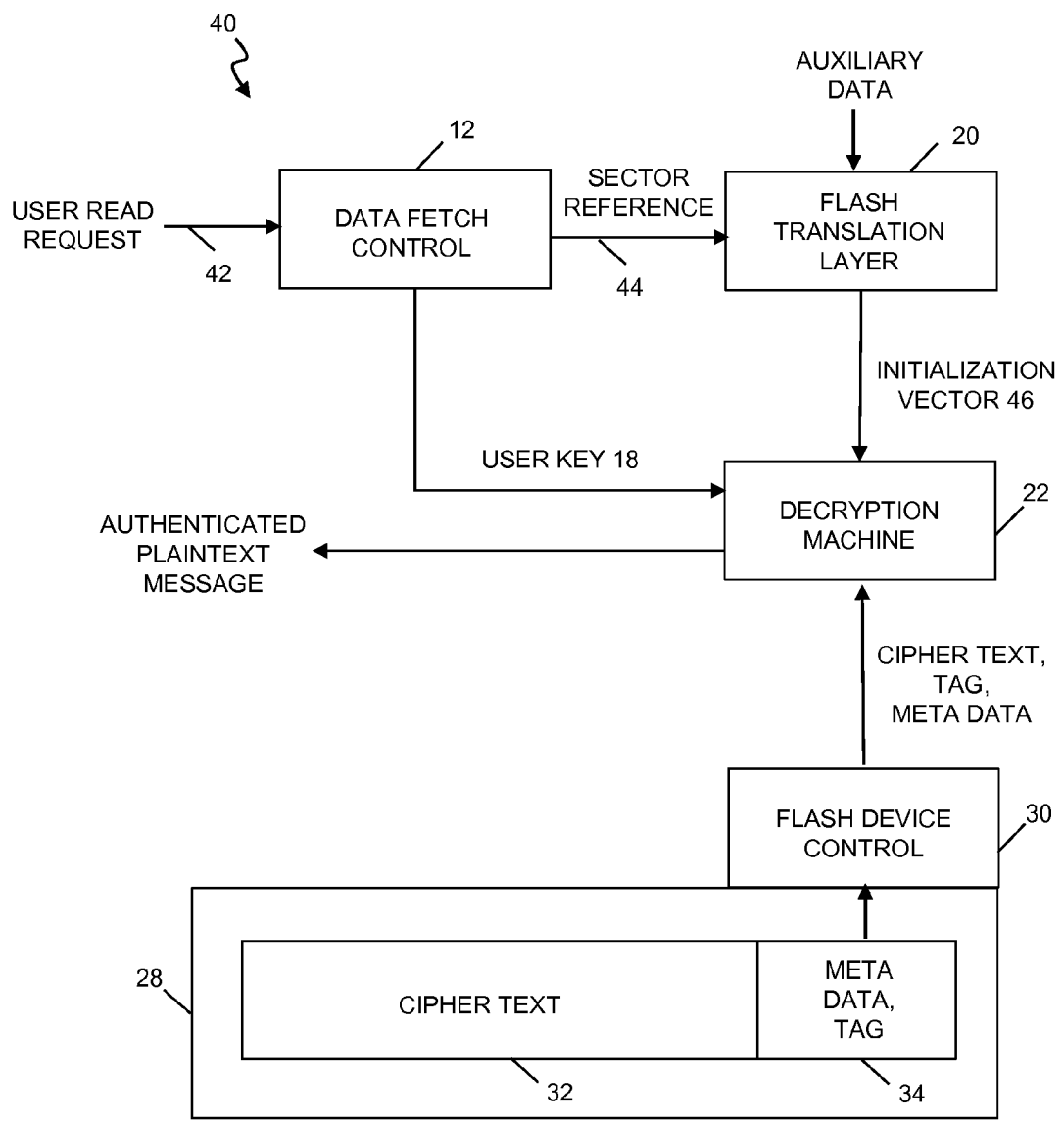
FIG. 2 is a simplified diagram illustrating a preferred embodiment of the decryption process according to the present disclosure.

FIG. 2 is a simplified diagram illustrating a preferred embodiment of a decryption process 40 for a flash storage device according to the present disclosure. A user read request 42 is received by the data fetch control block 12, which is adapted to generate the user key 18 and a sector reference 44 to the data. The flash translation layer 22 receives the auxiliary data or sector table information 20 as well as the sector reference 44, and generates an initialization vector 46 based on those data. The decryption machine 48 uses the user key 18, initialization vector 46, along with the authentication tag and meta data 34 stored in the flash device 28 to decipher the encrypted data or cipher text 32. As stated above, the authentication tag is primarily used to detect data tampering. If there is a mismatch of the authentication tag, the decryption machine outputs null or error that indicates unsuccessful deciphering.

The features of the present invention which are believed to be novel are set forth below with particularity in the appended claims. However, modifications, variations, and changes to the exemplary embodiments described above will be apparent to those skilled in the art, and the self-encrypting flash drive described herein thus encompasses such modifications, variations, and changes and are not limited to the specific embodiments described herein.

What is claimed is:

1. A method for storing user data in a flash storage device to enable detection of subsequent tampering, comprising:
   receiving a plaintext comprising at least a portion of the user data;
   receiving a user key;
   reading stored first metadata associated with a sector of the flash storage device, wherein the first metadata comprises at least one attribute associated with a physical location;
   generating an initialization vector based on the at least one attribute;
   encrypting the plaintext based on the user key and the initialization vector to generate a cipher text and first authentication data;
   storing the cipher text in the sector of the flash storage device; and
   storing the first authentication data as second metadata associated with the sector of the flash storage device.

2. The method of claim 1, further comprising:
   receiving a logical address for storing the at least a portion of the user data;
   mapping the logical address to the physical location.

3. The method of claim 1, wherein the at least one attribute comprises at least one of an age attribute, utilization information, and erase count.

4. The method of claim 1, wherein:
   the first metadata relates to flash storage device maintenance functions; and
   the first authentication data is usable to detect tampering of the cipher text and the first metadata.

5. The method of claim 1, wherein the at least one attribute comprises sector maintenance metadata pertaining to the sector.

6. A method for detecting occurrence of tampering with data stored in a flash storage device, comprising:
   determining a physical location in a sector of the flash storage device corresponding to encrypted user data to be read;
   reading cipher text from the physical location, where the cipher text comprises the encrypted user data;
   reading metadata associated with the sector of the flash storage device, the metadata comprising first authentication data and at least one attribute associated with the physical location; and
   generating an initialization vector based on the at least one attribute;
   decrypting the cipher text based on a user key and the initialization vector to generate a plaintext and second authentication data;
   determining the occurrence of tampering based on the first authentication data and the second authentication data.

7. The method of claim 6, wherein determining a physical location comprises receiving a logical address corresponding to the encrypted user data to be read; and mapping the logical address to the physical location.

8. The method of claim 6, wherein the initialization vector is generated based on the physical location and the at least one attribute.

9. The method of claim 6, wherein the at least one attribute comprises at least one of an age attribute, utilization information, and erase count.

10. The method of claim 6, wherein the at least one attribute comprises sector maintenance metadata pertaining to the sector.

11. A flash storage device comprising:
    a memory configured in a plurality of sectors, each sector comprising storage for user data and for first and second metadata associated with the particular sector;
    an encryption machine configured to:
    receive first plaintext, a user key, and an initialization vector; and
    encrypt the plaintext based on the user key and the initialization vector to generate a cipher text and an authentication tag; and
    a memory controller configured to:
    generate the initialization vector based on at least one attribute associated with a sector of the flash storage device;
    store the cipher text as user data in the sector of the flash storage device; and
    store the authentication tag as second metadata associated with the sector of the flash storage device.

12. The flash storage device of claim 11, wherein the memory controller is further configured to:
    receive a logical address corresponding to user data to be stored; and
    map the logical address to a physical location associated with the sector of the flash storage device.

13. The flash storage device of claim 11, wherein the at least one attribute comprises at least one of an age attribute, utilization information, and erase count.

14. The flash storage device of claim 11, wherein the at least one attribute comprises sector maintenance metadata pertaining to the sector.

15. A flash storage device comprising:

a memory configured in a plurality of sectors, each sector comprising storage for user data and for first and second metadata associated with the particular sector;

a memory controller configured to:

read cipher text from a physical location in a sector of the flash storage device, wherein the cipher text comprises encrypted user data;

read metadata associated with the sector of the flash storage device, the metadata comprising first authentication data and at least one attribute associated with the physical location;

generate an initialization vector based on the at least one attribute; and a decryption machine configured to:

receive the cipher text, a user key, and the initialization vector;

decrypt the cipher text based on the user key and the initialization vector to generate a plaintext and second authentication data; and determine the occurrence of tampering based on the first authentication data and the second authentication data.

16. The flash storage device of claim 15, wherein the memory controller is further configured to determine the physical location by:

receiving a logical address corresponding to encrypted user data to be read; and mapping the logical address to the physical location associated with the sector of the flash storage device.

17. The flash storage device of claim 16, wherein the at least one attribute comprises at least one of an age attribute, utilization information, and erase count.

18. The flash storage device of claim 16, wherein the at least one attribute comprises sector maintenance metadata pertaining to the sector.

* * * * *